United States Patent
Koyama

(10) Patent No.: US 7,136,262 B2
(45) Date of Patent: Nov. 14, 2006

(54) PIVOT ASSEMBLY PRELOADED BY LASER WELDING FOR HARD DISK DRIVE USE

(75) Inventor: Toshisada Koyama, Miyota-Machi (JP)

(73) Assignee: Minebea Co. Ltd, Nagano (JP)

( * ) Notice: Subject to any disclaimer, the term of this patent is extended or adjusted under 35 U.S.C. 154(b) by 217 days.

(21) Appl. No.: 10/645,115

(22) Filed: Aug. 21, 2003

(65) Prior Publication Data

US 2004/0100734 A1    May 27, 2004

(30) Foreign Application Priority Data

Aug. 21, 2002   (JP)   ............... 2002-240743

(51) Int. Cl.
  *G11B 5/54* (2006.01)
(52) U.S. Cl. ................. 360/265.2; 360/265.6
(58) Field of Classification Search ............. 360/97.01, 360/98.01, 98.07, 99.08, 265.2, 265.3, 265.4, 360/265.5, 265.6
  See application file for complete search history.

(56) References Cited

U.S. PATENT DOCUMENTS

| | | | |
|---|---|---|---|
| 3,894,383 A * | 7/1975 | Weis et al. .................. 56/17.5 |
| 4,144,923 A * | 3/1979 | Curry .......................... 157/13 |
| 4,526,257 A * | 7/1985 | Mueller ..................... 192/48.2 |
| 4,698,709 A | 10/1987 | Ihlenburg et al. |
| 4,984,115 A * | 1/1991 | Takahashi et al. ....... 360/265.6 |
| 5,529,404 A * | 6/1996 | Robinson et al. ........... 384/617 |
| 5,880,543 A * | 3/1999 | Park ......................... 310/67 R |
| 5,882,122 A * | 3/1999 | Noguchi et al. ............ 384/490 |
| 6,232,690 B1 * | 5/2001 | Schmider ............... 310/156.37 |
| 6,328,475 B1 * | 12/2001 | Jager .......................... 384/107 |
| 6,469,410 B1 * | 10/2002 | Akahori ....................... 310/90 |
| 6,666,328 B1 * | 12/2003 | Sykora ....................... 198/853 |
| 2001/0026653 A1 | 10/2001 | Dardelet et al. |
| 2002/0006015 A1 * | 1/2002 | Mouri et al. ............. 360/265.2 |
| 2004/0136116 A1 * | 7/2004 | Koyama .................. 360/265.2 |

FOREIGN PATENT DOCUMENTS

EP   0 771 003 A2   5/1997

\* cited by examiner

*Primary Examiner*—Jefferson Evans
(74) *Attorney, Agent, or Firm*—Joel E. Lutzker; John C. Garces; Schulte Roth & Zabel LLP

(57) ABSTRACT

A pivot assembly for use in a hard disk drive, in which ball bearings are placed at both ends of a shaft, and a spacer is disposed between outer rings of the ball bearings. The spacer is fixed to the outer rings by laser welding.

5 Claims, 3 Drawing Sheets (A)

(B)

(C)

(D)

PIVOT ASSEMBLY PRELOADED BY LASER WELDING FOR HARD DISK DRIVE USE

CROSS-REFERENCE TO RELATED APPLICATIONS

This application claims all rights of priority to Japanese Patent Application No. 2002-240743 filed on Aug. 21, 2002, (pending).

BACKGROUND OF THE INVENTION

The invention relates to a pivot assembly used as the bearing of a swing arm type actuator in a hard disk drive. More particularly, the invention relates to an improvement of the fixing means of a spacer which accomplishes spacing of ball bearings.

Conventional pivot assemblies include ball bearings fixed at both ends of a shaft. A spacing between outer rings of the ball bearings is accomplished by a ring shaped spacer.

A convex line is formed at an inner circumferential side edge of an end face of the spacer. The convex line protrudes in an axial direction of the spacer. Additionally, a concave part is formed at an inner circumference side edge of an end face of the outer ring. Convex lines of the spacer and the concave part of each outer ring are configured to be joined together such that the spacer is held between the outer rings. This pivot assembly is then bonded to a base of a swing arm having a magnetic head at its tip.

In the above-mentioned conventional pivot assembly, the spacer is held by joining a convex line of the spacer with a concave part of each outer ring. In such arrangement it is likely that the precision of the assembly becomes insufficient due to convex stripe machining errors. Particularly, the degree of parallelization of the spacer is typically insufficient. Additionally, the area of contact between an outer ring and the spacer is small, resulting in a reduced holding strength.

In the process of manufacturing the described conventional pivot bearing assembly, the convex line has to be machined to accomplished its precise shape and size. Therefore, the manufacturing process of such bearing assembly is complicated, resulting in higher manufacturing costs.

The above mentioned bonding of the swing arm and the pivot assembly must be performed in the conventional assembly because holding of the spacer is unstable. Therefore, if a defect occurs in one of the constituent parts the entire unit must be discarded, which is obviously uneconomical. Additionally, outgassing from the bonding agent brings about a harmful effect on the surface of the hard disk and magnetic head.

In conventional designs of the pivot assembly, it is common for the outer ring to have an abbreviated circular arc-shaped chamfer at the peripheral edge of its outer circumferential surface at its end face. When the outer diameter of the spacer is the same as that of the outer ring, a concave part is formed between them. In this case, the concave part the gap becomes smaller towards the inner part of the connection. If laser welding was to be used with this conventional assembly, a laser beam must correctly hit the line of contact between the spacer and outer ring positioned in the innermost part of the formed connection. Moreover, the laser beam must irradiate so as to follow the common tangent of the chamfer and the end face of the spacer. When these points are taken into consideration, in the event the laser beam is of a small diameter as mentioned above, where the position of the spacer fluctuates even slightly, the laser beam cannot irradiate the necessary place making laser welding, practically, impossible.

SUMMARY OF THE INVENTION

Consequently, it is an object of the present invention to provide a pivot assembly that can solve the above-mentioned problems by securely fixing a spacer to an outer ring.

In general, in one of its aspects, the invention provides a pivot assembly for use in a hard disk drive in which ball bearings are joined to both ends of a shaft, and a spacer is disposed between the outer rings of these ball bearings. The spacer is fixed to the outer rings by laser welding.

Laser welding the spacer to the outer rings accomplishes a strong and secure attachment of these parts. The swing arm can then be attached to the pivot assembly with a screw by forming a screw hole in the spacer. In case a defect occurs in one part of the assembly, the defective part (e.g., the swing arm or the spacer) can be removed and non-defective parts can be reused. Furthermore, because adhesive agent is not applied, there is no outgassing.

When the pivot assembly is manufactured in accordance with the present invention, conventional machining of the convex line is unnecessary. Therefore, machining precision of the end face of the spacer can be heightened to a greater extent achieving a better contact between the spacer and the outer ring. The strength and stability of the spacer's connection is also improved, manufacturing costs are reduced and assembly work is simplified.

Welding of the spacer to the outer ring can be carried out using any well-known positioning technique (e.g., using chuck and vise). Laser welding improves positioning accuracy and rigidity of the pivot assembly, as compared to the conventional sandwich contact bond. Improvement in rigidity leads to a better vibration resistance and resonance resistance, including resistance during handling.

The above advantages and features are of representative embodiments only. It should be understood that they are not to be considered limitations on the invention as defined by the claims. Additional features and advantages of the invention will become apparent in the following description and from the claims.

BRIEF DESCRIPTION OF THE DRAWINGS

A full understanding of the invention can be gained from the following description of the preferred embodiments when read in conjunction with the accompanying drawings in which.

DETAILED DESCRIPTION

This invention solves the problems of prior art by providing a pivot assembly for use in a hard disk drive. The pivot assembly includes ball bearings secured at both ends of a shaft and a spacer disposed between outer rings of the ball bearings, the spacer being fixed to the outer rings by laser welding.

Figure 1:
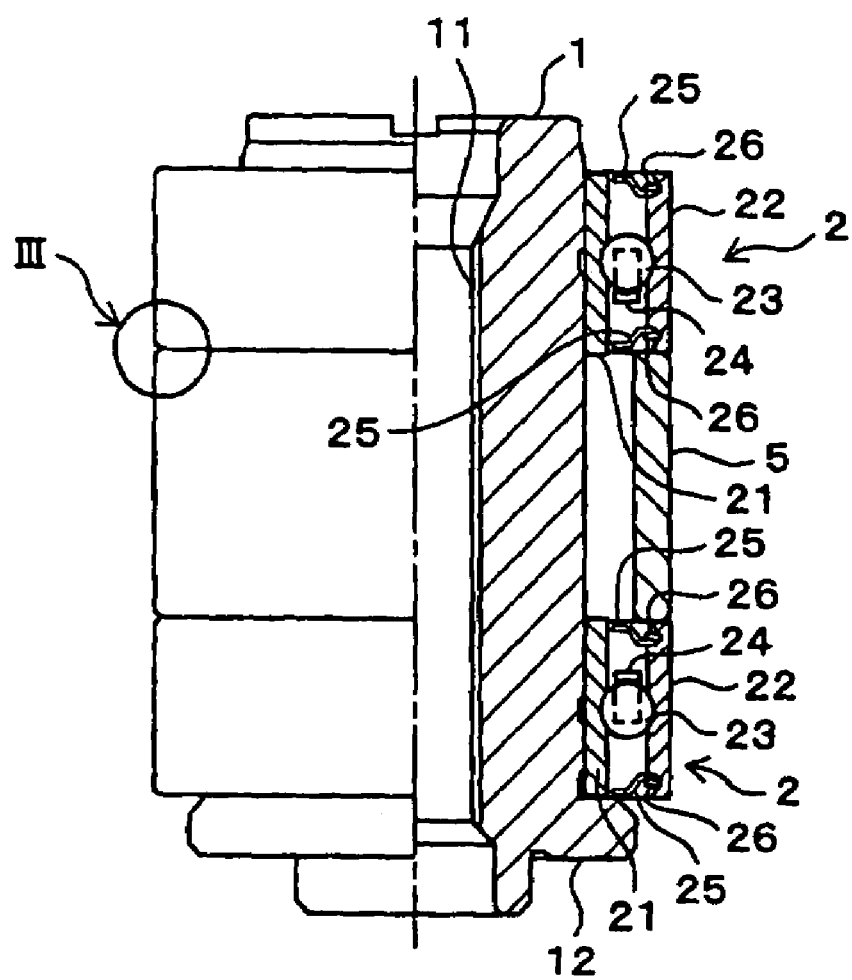
FIG. 1 is a partial cross-sectional view showing the pivot assembly of an embodiment of the present invention.
Figure 2:
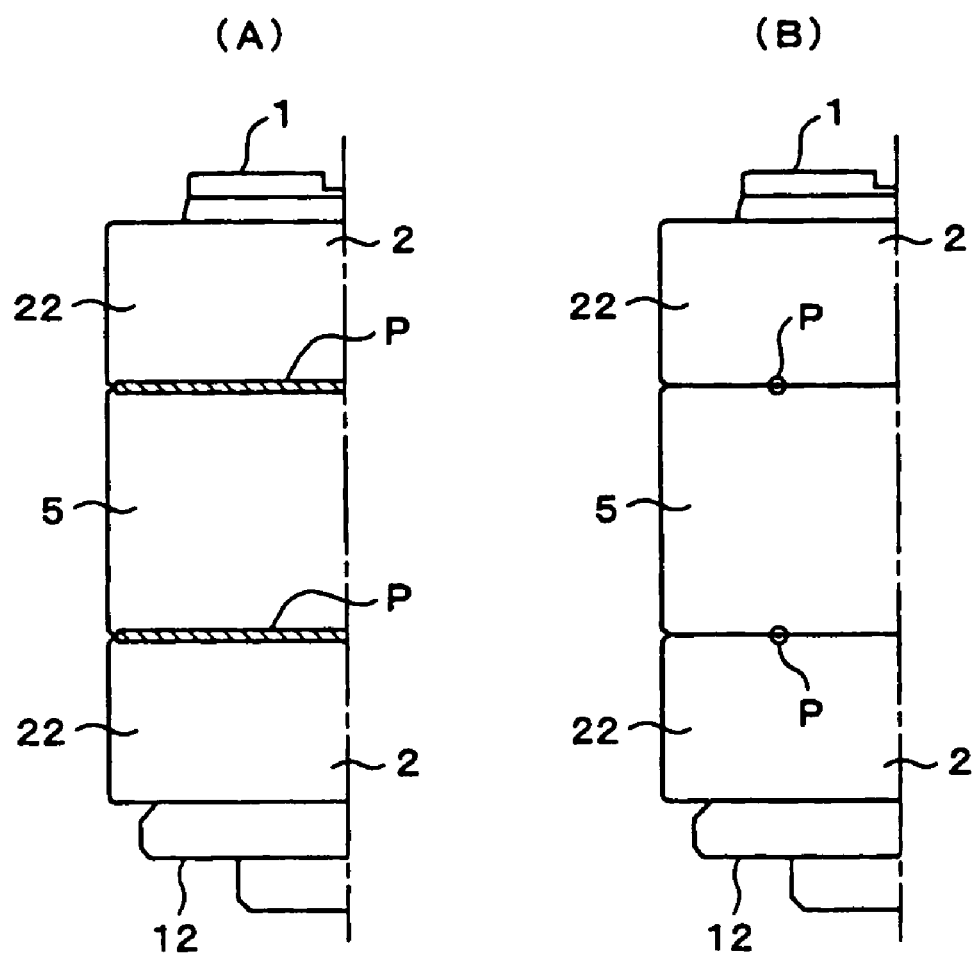
FIG. 2(A) is a side view showing the pivot assembly of an embodiment of the present invention.
FIG. 2(B) is a side view showing a modified example of FIG. 2(A).
Figure 3:
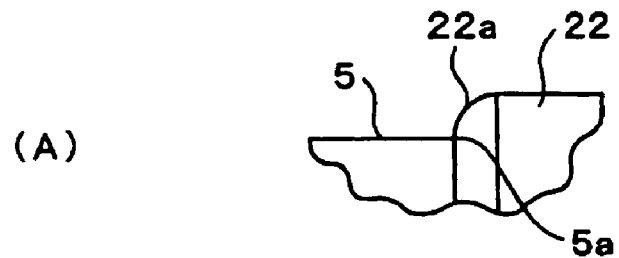
FIG. 3(A) is an enlarged side view of a welded part.
FIGS. 3(B)–(D) are side views showing modified examples of FIG. 3(A).
Figure 3:
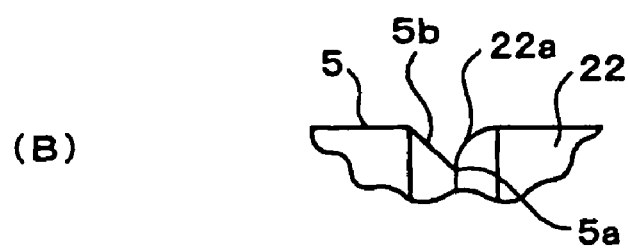
Figure 3:
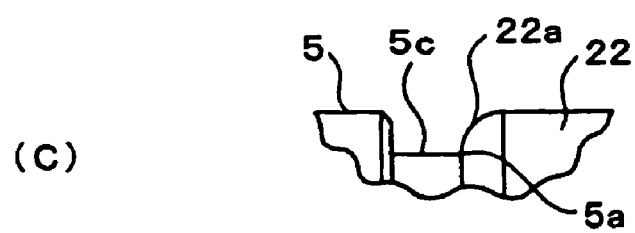
Figure 3:
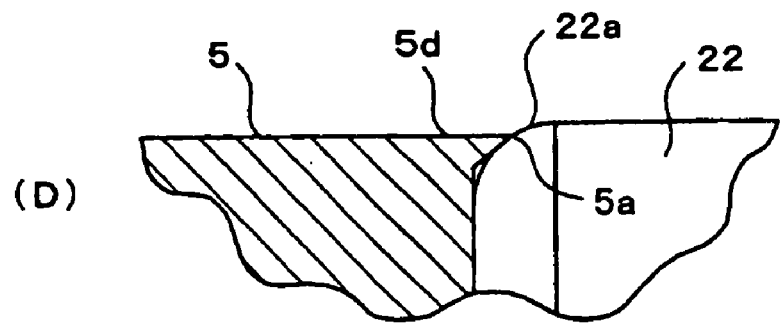

In accordance with a first embodiment of the present invention, screw hole 11 is formed in the center of shaft 1. The pivot assembly can be secured to a hard disk drive by means of a bolt screwed into screw hole 11, as shown in FIGS. 1–3. Flange 12 is formed at the lower end part of shaft 1. Lower ball bearing 2 is positioned adjacently to the outer circumferential surface of the shaft and is secured to flange 12 such that the ball bearing contacts the end face of the flange.

Ball bearing 2 has an inner ring 21, an outer ring 22 and multiple balls 23 positioned between the inner and outer rings such that they can roll in a circumferential direction between them. Balls 23 are kept at regular intervals from each other in a circumferential direction by means of retainer 24. Opened end surfaces of both bearings are covered by seals 25 placed between inner ring 21 and outer ring 22. Seal 25 is secured in the bearing with snap ring 26.

Upper ball bearing 2 is secured to the upper end part of shaft 1. Spacer 5 is attached between outer rings 22 of the two ball bearings 2 such that outer rings 22 are securely separated from each other by a fixed interval.

As shown in FIG. 3(A), a cross-sectional circular arc shaped chamfer 22a is formed at the peripheral edge of the end face of outer ring 22. Spacer 5 is formed with a sharp edge 5a created at the intersection of the outer cylindrical surface and an end face of the spacer. The outer diameter of spacer 5 is set to be smaller than the outer diameter of the outer ring 22. Therefore, sharp edge 5a is disposed adjacently to the end face of outer ring 22 closer to the edge of its inner circumferential surface rather than chamfer 22a. Spacer 5 and outer ring 22 are disposed in concentric circles with the sharp edge 5a. Sharp 5a is fixed to the end face of outer ring 22 by laser welding. Reference numeral P in FIG. 2(A) indicates a nugget created by seam welding, such that, the entire circumference of sharp edge 5a is laser welded.

As shown in FIG. 2(B), spacer 5 can also be spot welded to outer ring 22 at multiple places separated by regular intervals in a circumferential direction (two places in the shown embodiment). Positioning of spacer 5 and outer ring 22 can be carried out by, for example, installing three claw chucks consecutively in an axial direction and holding outer ring 22 and spacer 5 by each chuck respectively.

The base of a swing arm having a magnetic head at its tip is attached to the outer circumference of the pivot assembly. A hole is provided at the base of the swing arm. A screw can be inserted into the hole and screwed into a screw hole (not shown) of spacer 5, thereby joining the pivot assembly with the swing arm.

In the above described embodiment of the pivot assembly for use in a hard disk drive, spacer 5 is securely and reliably fixed to outer ring 22 by laser welding. The swing arm can then be attached to the pivot assembly with a screw screwed into the screw hole formed in spacer 5. Therefore, if a defect occurs, either the swing arm or the spacer, or both, can be removed and the non-defective part can be reused. Laser welding also solves the problem of outgassing.

Because the end face of spacer 5 is flat, its machining precision (particularly parallelization) can be heightened to the greatest extent. Consequently, better contact between spacer 5 and outer ring 22 can be achieved, thus allowing the spacer to be more stabilized and strongly fixed. Furthermore, since the positioning of the spacer 5 and the outer ring 22, at the time of laser welding, can be carried out using a well-known coaxial holding means such as a chuck and vice, the positioning precision can be improved. Also, since forming spacer 5 in a simple cylindrical shape is adequate for the present invention, the manufacturing cost can be reduced, and the assembly work of spacer 5 is simplified.

As shown in FIG. 3(A), sharp edge 5a is formed at the outer circumference of spacer 5 and is positioned closely to the flat surface of the inner circumferential side of the end face of outer ring 22 rather than its chamfer 22a. Therefore, sharp edge 5a or the boundary of outer ring 22 can be irradiated by a laser beam having a small diameter spot, making spot welding possible.

In the embodiment described above, the diameter of spacer 5 is made smaller than the diameter of outer ring 22, thus placing sharp edge 5a closer to the inner circumference side of the outer ring's end face rather than its chamfer 22a. However, use of modified embodiments is also possible. Examples of possible modified examples are shown in FIGS. 3(B)–3(D). FIG. 3(B) shows an embodiment in which spacer 5 is formed with the same diameter as outer ring 22. Spacer 5 includes a chamfer 5b of a tapered shape formed at an edge of the spacer, and outer ring 22 includes chamfer 22a. Sharp edge 5a is then formed at the boundary of the end face of chamfer 5b. In this modified example, laser welding is performed at sharp edge 5a, positioned adjacently to the end face of outer ring 22 closer to its inner circumferential side rather than chamfer 22a.

Another modified embodiment is shown in FIG. 3(C). In this modified embodiment, spacer 5 is formed with the same diameter as the outer diameter of outer ring 22. A smaller diameter section 5c is formed at the end of spacer 5. In this modified embodiment, sharp edge 5a is formed at the peripheral border of the end face of smaller diameter section 5c. Similarly to the above embodiments, sharp edge 5a is positioned adjacently to the inner circumferential side of the end face of outer ring 22 rather than chamfer 22a. Laser welding is performed along sharp edge 5a.

An additional modified embodiment of the present invention is shown in FIG. 3(D). In the shown alternative embodiment, spacer 5 has an outer diameter which is slightly smaller than the diameter of outer ring 22. Convex-shaped portion 5d protruding towards outer ring 22 is formed at the peripheral edge region of spacer 5. Sharp edge 5a is formed as the edge of convex-shaped portion 5d, such that the inner surface of the convex-shaped portion substantially overlays the outer surface of chamfer 22a and sharp edge 5a is positioned closely to the outer surface of chamfer 22a. Sharp edge 5a is fixed to the outer surface of chamfer 22a of outer ring 22 by laser welding.

In the preferred embodiments of the present invention, the outer circumferential side of sharp edge 5a is preferably open, such that a laser beam can irradiate and weld either at sharp edge 5a or the boundary of outer ring 22. In an alternative preferred embodiment, the pivot assembly may include a separator having a diameter larger than that of the outer ring. The separator may be formed with stepped end portion which would be placed adjacently to the chamfer, with its outer circumference edge being laser welded to the outer ring.

As will be appreciated by a person skilled in the art, any known source of laser welding, for example, a YAG laser, can be used with the present invention. Furthermore, laser welding can be carried out across the entire circumference of the point of contact of the outer ring with the spacer (seam welding), or can be carried out at multiple places separated from each other along the line of contact (spot welding).

In a conventionally known design of the pivot assembly, welding process greatly lowered the bearing precision due to the thermal effect generated because of electric resistance. With the present invention, because a spacer is welded to the outer ring by means of laser welding, the impact of the welding process can be contained within a smaller portion of the assembly. For example, the diameter of the laser beam can be narrowed to about 0.4 mm during spot welding. Thus, the impact of the thermal effect is reduced and lowering of the bearing precision is prevented by the present invention.

As mentioned above, an open space comparable with the light path of the laser beam may be formed in the outer circumferential side of the sharp edge. When the cross-section of the sharp edge is viewed as a circular arc, the radius of the sharp edge is 0.1 mm or less. In the event the spacer is machined by turning and grinding, the above radius can be easily achieved.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A pivot assembly for hard disk drive use comprising:
    a pair of ball bearings, said ball bearings being spaced apart, each of said bearing further comprising an outer ring; and
    a spacer extended between said outer rings of said ball bearings;
    wherein said spacer is fixed to said outer rings of said ball bearings by laser welding; wherein said spacer further comprises a sharp edge formed at an outer circumferential border of an end face of said spacer; wherein each of said outer rings further comprise a chamfer of a cross-sectional abbreviated circular arc shape formed at an outer circumferential border of an end face of said each outer ring and an inner circumferential portion of said end face; and
    wherein said sharp edge is laser welded to said inner circumferential portion of said end face.

2. The pivot assembly for hard disk drive use according to claim 1,
    wherein said spacer further comprises an outer diameter;
    wherein said outer rings further comprise an outer diameter;
    wherein at least a portion of said outer diameter of said spacer is smaller than said outer diameter of said outer rings; and
    wherein said sharp edge is formed on said portion of said spacer having said smaller outer diameter.

3. The pivot assembly for hard disk drive use according to claim 1,
    wherein said spacer comprises a portion having a larger diameter and a portion having a smaller diameter; and
    wherein said sharp edge is formed on said portion having a smaller diameter.

4. The pivot assembly for hard disk drive use according to claim 1,
    wherein said sharp edge further comprises a radius of 0.1 mm or less.

5. The pivot assembly for hard disk drive use according to claim 1,
    wherein said spacer further comprises means for attaching a swing arm.

* * * * *